United States Patent [19]

Fock et al.

[11] Patent Number: 4,663,235
[45] Date of Patent: May 5, 1987

[54] REDUCTION IN THE ADHESION TO GLASS OF THERMOPLASTIC, PLASTICIZED POLYVINYLBUTYRAL MOLDING COMPOSITIONS

[75] Inventors: Kurt Fock; Hans D. Hermann, both of Bad Soden am Taunus; Klaus Fabian, Kriftel; Joachim Ebigt, Frankfurt am Main, all of Fed. Rep. of Germany

[73] Assignee: Hoechst Aktiengesellschaft, Fed. Rep. of Germany

[21] Appl. No.: 732,734

[22] Filed: May 10, 1985

[30] Foreign Application Priority Data

May 12, 1984 [DE] Fed. Rep. of Germany ....... 3417654

[51] Int. Cl.[4] .............................................. B32B 17/10
[52] U.S. Cl. .................................... 428/437; 156/106; 428/410; 524/174; 524/175; 524/178; 524/394; 524/399; 524/557

[58] Field of Search ................ 428/410, 437; 524/557, 524/394, 399, 174, 175, 178; 156/106

[56] References Cited

U.S. PATENT DOCUMENTS

4,533,601 8/1985 Hermann et al. ................... 524/394

Primary Examiner—George F. Lesmes
Assistant Examiner—P. R. Schwartz
Attorney, Agent, or Firm—Berman, Aisenberg & Platt

[57] ABSTRACT

Reduction in the adhesion to glass of thermoplastic, plasticized polyvinylbutyral molding compositions, in particular sheeting, by the addition of a metal salt and/or metal chelate of an enolizable $\beta$-diketone, or mixtures of these compounds, as an non-stick agent, preferably in amounts of 0.003 to 0.3% by weight, relative to the plasticized polyvinylbutyral. It is preferable to employ the non-stick agent in the form of a solution in the plasticizer. The use of the sheeting having an adhesion to glass reduced in accordance with the invention as a laminating layer for the production of glass laminates.

11 Claims, No Drawings

REDUCTION IN THE ADHESION TO GLASS OF THERMOPLASTIC, PLASTICIZED POLYVINYLBUTYRAL MOLDING COMPOSITIONS

The invention relates to thermoplastic, plasticized polyvinylbutyral molding compositions, in particular sheeting, which have a reduced adhesion to glass and which contain, as the non-stick agent, a metal salt and/or metal chelate of an enolizable β-diketone or mixtures of these compounds, to a process for their production and to their use for the production of glass laminates.

Laminated safety glass is composed of at least two or more sheets of glass together with one or more bonding interlayers composed of plastic sheeting. The plastic interlayer fulfils the purpose that the laminated sheet shall not be perforated in the event of an impact and that the glass splinters formed thereby remain adhering.

Since the impact resistance of laminated safety glass is a function of the adhesion of the sheeting to the glass, it is necessary to regulate the adhesion to the glass in a defined manner in order to achieve an impact resistance appropriate to the requirements in a given case.

In the event that the adhesion is too strong, the sheeting does not separate from the glass under the influence of the impact, but tears at the crack in the glass as the result of local overstretching. If the adhesion to the glass is inadequate, glass splinters detach themselves from the sheet.

Only if the adhesion to the glass is correctly adjusted does the sheeting separate from the glass in such a way that the energy of the impact can be destroyed by the sheeting without overstretching taking place at the crack in the glass and without glass splinters splitting off as a result.

In general, polyvinylbutyral sheeting, which has proved successful for many years as an interlayer for laminated safety glass, has too high an adhesion to glass. It is known to reduce the adhesion to glass of sheeting which adheres too strongly in the most simple way by adding water. In the case of strongly adhering sheeting, a water content of over 0.8% by weight is required to reduce the adhesion of the sheeting. However, a water content as high as this promote the formation of bubbles in the laminate in an undesirable manner.

It is also known to reduce the adhesion to the glass by adding salts of various alkali metals, alkaline earth metals and other metals. A particularly advantageous non-stick action is given by potassium compounds having an alkaline reaction, such as, for example, potassium hydroxide or potassium acetate, or potassium salts such as have been described, for example in German Pat. No. 1,289,261, for reducing adhesion to glass.

Magnesium salts of monocarboxylic and dicarboxylic acids are also mentioned frequently as non-stick agents. For instance, magnesium salts of various carboxylic acids are mentioned in U.S. Pat. Nos. 3,249,487 and 3,249,490.

Betaines, such as have been described, for example, in German Offenlegungsschrift No. 2,646,280, and also other compounds having a betaine structure, are also good nonstick agents.

In some cases the said compounds are very suitable for selectively reducing the adhesion to glass of plasticized polyvinylbutyral sheeting and thus for increasing the impact resistance of glass laminates made from this sheeting.

However, it is a common feature of all the nonstick agents mentioned that they are not easy to distribute uniformly in the polymer/plasticizer mixture. The most advantageous manner of effecting this is to allow the non-stick agent to dry on the polyvinylbutyral from an aqueous solution. However, it is also possible in accordance with the state of the art to treat the finished sheeting or the glass with a non-stick solution before the production of the laminated glass. The addition of the non-stick agent as a solution to the plasticizer has also already been described. However, in this case the non-stick agent generally separates out from the plasticizer. An unstable suspension is formed which in most cases only remains usable for a short time.

The aim of the work which has led to the present invention was, therefore, to find non-stick agents which either dissolve in the plasticizer in the required concentration without further treatment or can be added as a solution to the plasticizer without separating out of the non-stick agent taking place.

It has now been found, surprisingly, that metal salts and/or metal chelates of enolizable β-diketones fulfil these conditions and can produce excellent nonstick effects.

In principle, all metal compounds which can be prepared from enolizable β-diketones are suitable. In particular, salts or metal chelates of β-diketones with metals of the groups IA, IIA, IIIA, IVA and IIB of the periodic system of the elements are used. Of these, the magnesium compounds are particularly preferred, and the anionic component employed can be any desired enolizable β-diketone, for example 1,3-dioxo-1-phenylhexane, 2,4-dioxo-3-methylpentane or acetylacetone.

Examples of preferred metals are potassium, magnesium, calcium, aluminum, zinc and tin. Magnesium is particularly preferred.

The preparation of the non-stick agents according to the invention can be effected in a known manner.

The invention relates, therefore, to a process for reducing the adhesion to glass of thermoplastic, plasticized polyvinylbutyral molding compositions by mixing the constituents of the molding compositions with a non-stick agent belonging to the group of metal compounds, which comprises employing, as the non-stick agent, metal salts and/or metal chelates of enolizable β-diketones with metals of groups IA, IIA, IIIA, IVA and IIB of the periodic system of the elements or mixtures of these compounds.

The thermoplastic, plasticized polyvinylbutyral molding composition can preferably be sheeting.

The invention also relates, therefore, to thermoplastic, plasticized polyvinylbutyral sheeting which has its adhesion to glass reduced in accordance with the invention and to the use thereof for the production of glass laminates, and also to glass laminates containing thermoplastic, plasticized polyvinylbutyral sheeting having an adhesion to glass reduced in accordance with the invention as the laminating layer.

The non-stick agents according to the invention can preferably be combined, at least in the presence of a solvent or solubilizer, with the plasticizer to form a clear solution which remains stable for a prolonged period.

It is preferable to employ the acetylacetonates of the metals mentioned. Some acetylacetonates of this type are described, for example, in Ullmann's Encyclopädie der Technischen Chemie (Ullmann's Encyclopedia of Industrial Chemistry), 4th edition, volume 14 (1977), page 215. Magnesium, acetylacetonate is used very particularly preferred as the non-stick agent.

The required concentration of non-stick agent depends on the type of polyvinylbutyral, in particular on the content of vinyl alcohol units in this polymer, and also on the nature of the plasticizer and on the quality of the glass used. In general, the concentrations are preferably between 0.003 and 0.3% by weight, relative to the plasticized polyvinylbutyral. It is particularly preferable to employ concentrations between 0.01 and 0.2% by weight.

The polymers which can be used are, in principle, any polyvinylbutyral which is suitable for the production of lamination sheeting. Examples of these are polyvinylbutyrals having a content of vinyl alcohol units of, preferably, 15 to 28% by weight, in particular 16 to 24% by weight, and also having a content of vinyl acetate units of, preferably, 1 to 3% by weight. They can be prepared in any desired manner, for example by the process of German Pat. No. 2,732,717.

The viscosity of the polymers to be used is within the customary range. Polyvinylbutyrals which are particularly suitable are those in which the viscosity of a 5% strength by weight ethanolic solution at 23° C. is between 30 and 200 mPa.s (determined as specified in DIN 53,015).

The non-stick agents can be mixed with the polymer or the plasticizer or the polymer/plasticizer mixture in any desired manner before or during processing. It is particularly advantageous to dissolve the non-stick agent in the plasticizer without further treatment, preferably in concentrations below 0.05% by weight, relative to the polymer/plasticizer mixture. In addition, a preferred embodiment consists of dissolving the acetylacetonate in a solvent or solubilizer which is miscible with the plasticizer and combining it in this form with the plasticizer, whereupon a clear and stable solution is formed. Examples of suitable solvents are alcohols, preferably methanol, or ketones, preferably acetone.

In addition, it is possible to incorporate the non-stick agent into the polyvinylbutyral from an aqueous solution or directly, without a diluent. When the nonstick agent has been added, the solvent which may also have been used as well is in most cases present only in such a low concentration in the polymer/plasticizer mixture that it does not adversely affect the properties of the sheeting. It can, however, also be removed by evaporation or degassing before or during the processing of the mixture of sheeting components to form the sheeting.

The plasticizer components used are those known in the state of the art. It is preferable to use plasticizers which, under the conditions which have to be maintained, are compatible with the polymers to be employed in accordance with the invention. Thus, for polymers containing up to approx. 21–22% by weight of vinyl alcohol units in their structure, it is possible to use, for example, esters of diethylene, triethylene and tetraethylene glycol with aliphatic, linear or branched carboxylic acids having 5–10 carbon atoms or esters of phthalic acid with alcohols having 4–10 carbon atoms. In the case of polymers containing higher proportions of vinyl alcohol units it can be advantageous to employ phosphoric acid esters mixed with the plasticizers mentioned, in order to improve the compatibility.

Plasticizers which are particularly preferred are the mentioned esters of triethylene glycol.

In addition, it is also possible to use other plasticizers, such as, for example, adipic and sebacic acid esters and phosphoric acid esters, on their own or as mixtures.

The concentration of plasticizer in the polymer/plasticizer mixture can preferably be between 20 and 40% by weight, in particular between 25 and 35% by weight, relative to the plasticized polyvinylbutyral. Plasticizer concentrations of 27–32% by weight are particularly preferred. If the plasticizer concentrations are too low, the processability of the mixtures can be adversely affected; if the plasticizer concentration is too high, the strength required in the sheeting is frequently no longer achieved.

In addition to the non-stick agents claimed, the polymer/plasticizer mixture can also contain other nonstick agents, such as the known potassium or magnesium salts and also betaines and lecithin, and also other customary additives, such as, for example, stabilizers and antiblocking agents, in customary concentrations, for example between 0.01 and 1% by Weight, relative to the plasticized polyvinylbutyral. The polymer, the plasticizer and the additives can be processed in a known manner on a calender or in an extruder to give sheeting, preferably 0.3–1.5 mm thick.

The finished glass-lamination sheeting, if appropriate after conditioning, which is necessary in order to adjust the water content of the sheeting to approx. 0.2–0.8% by weight, is processed in a customary manner with glass sheets to give the laminate. The adjustment of the water content is desirable because it also reduces the adhesion to the glass. The water content indicated should preferably not be exceeded in order to prevent the formation of bubbles during processing.

In the production of the glass laminate, the sheeting is, for example, placed between glass sheets 1 to 3 mm thick and compressed at 60°–100° C. to form a pre-laminate. The final laminate is produced from the latter, for example in an autoclave at 120°–160° C. and 8–16 bar. In the tests described in the examples below, the glass sheets were washed with demineralized water before the production of the laminate.

The quality of the laminate can be tested by subjecting it to a comprehensive program of tests.

The so-called pummel test is frequently used to assess the quality of the laminate, especially the adhesion to the glass. In this test a glass laminate is cooled to −18° C., placed on a metal support and shattered by means of a hammer weighing 500 g. The laminate is assessed by means of pummel values between 0 (no adhesion) and 10 (complete adhesion) in accordance with the amount of glass which detaches itself from the sheeting in this test. A description of the test is to be found in British Pat. No. 1,093,864.

The adhesion to the glass can be determined very well by means of a shear test, as is described in German Offenlegungsschrift No. 3,038,449. In the measurements carried out in the examples below, laminated strips composed of float glass 3 mm thick, washed with demineralized water, and polyvinylbutyral sheeting of the thickness indicated in the examples are used. The dimensions of the strips are approx. 100 ×15 mm; the laminated area to be sheared, which is measured accurately before every tensile test, has dimensions of approx. 15 ×7 mm.

The laminated strips are ruptured at a rate of 200 mm/minute in a commercially available device made by Wolpert, Ludwigshafen.

The optimum shear strength, adjustment of which results in impact-resistant glass laminates, is generally between 1.5 and 5 MPa, preferably between 2 and 4 MPa. A particularly preferred range is between 2.5 and 3.5 MPa. High-strength sheeting can, without detriment, have somewhat higher shear strength values than sheeting of lower strength. This at the same time reduces the risk of the glass splintering when it is fractured.

The most important test method in practice is the falling ball test specified in DIN 52,306 (dynamic method). For this test, glass laminates measuring approx. 30 ×30 cm are produced from two sheets of float glass 3 mm thick and plasticized polyvinylbutyral sheeting approx. 0.76 mm thick. The average fracture height of the laminates, i.e. the height at which half of the sheets tested are broken is determined using a steel ball weighing 2260 g.

The invention is illustrated in greater detail by means of the following examples.

EXAMPLE 1

A polyvinylbutyral containing 20.6% by weight of vinyl alcohol units is kneaded in a Rheocord kneader for 5 minutes at 140° C. and 50 r.p.m. together with 29% by weight of triethylene glycol bis-(2-ethylbutyrate) (relative to the mixture of polyvinylbutyral and triethylene glycol bis-(2-ethylbutyrate) in which 0.01 to 0.08% by weight (relative to the mixture) of magnesium acetylacetonate has been dissolved. Samples from the kneader are compressed to give sheeting 0.76 mm thick, and this, after conditioning, is processed further with sheets of float glass 3 mm thick in an autoclave to give laminated safety glass. The results of the shear strength test are shown in summary form in Table 1.

At the same time the table also shows a zero value, resulting from an analogous test without added magnesium acetylacetonate. Table 1

The non-stick action of Mg acetylacetonate

TABLE 1

| Mg acetylacetonate content (% by weight, relative to the mixture of PV-butyral and plasticizer) | Shear strength (MPa) | Fracture height (m) | MFI+ 10/ 150° C. | 2.16/ 190° C. |
|---|---|---|---|---|
| 0.000 | 6.31 | 3.40 | 5.11 | 3.80 |
| 0.010 | 5.39 | 3.90 | 7.35 | 4.46 |
| 0.015 | 4.34 | 4.50 | 7.26 | 4.62 |
| 0.020 | 4.19 | 4.90 | 7.21 | 4.25 |
| 0.040 | 3.38 | 6.60 | 7.39 | 4.12 |
| 0.080 | 3.15 | 7.15 | 6.67 | 3.98 |

+MFI = melt flow index (kg at °C.)

EXAMPLE 2

Mixtures of polyvinylbutyral containing 20.6% by weight of vinyl alcohol units and having a plasticizer content of 29% by weight are prepared analogously to Example 1. The plasticizer is composed of triethylene glycol bis-(2-ethylbutyrate) containing in one case 0.01% by weight and in another case 0.015% by weight (relative to the mixture) of magnesium acetylacetonate, the latter having been dissolved directly in the plasticizer. The plasticizer/magnesium acetylacetonate solutions are colorless and clear.

The respective mixtures are extruded at 170° C. to give sheeting 0.76 mm thick, which is subsequently compressed. Sheets of laminated safety glass prepared from this sheeting, using float glass sheets 3 mm thick, have the properties shown in summary form in Table 2, in comparison with the zero value. Table 2

TABLE 2

The non-stick action of Mg acetylacetonate

| Mg acetylacetonate content (% by weight, relative to the mixture of PV-butyral and plasticizer) | Shear strength (MPa) | Fracture height (m) |
|---|---|---|
| 0.000 | 5.45 | 3.5 |
| 0.010 | 4.53 | 4.0 |
| 0.015 | 3.74 | 5.0 |

EXAMPLE 3

Example 2 is repeated, with the exception that, before the preparation of the polymer/plasticizer mixture, not only 0.015% by weight of magnesium acetylacetonate, but also 0.1% by weight of H 365D+ and 0.2% by weight of TiOuvin P++ are dissolved directly in the plasticizer. This mixture is extruded at 170° C. to give sheeting. The glass laminates obtained from this sheeting are clear and give an average fracture height of 5.13 m in the falling ball test, using a steel ball weighing 2260 g.

An average fracture height of 4.20 m results under otherwise identical conditions if non-stick agents and stabilizers are not added.

+ H 365 D = a commercially available heat stabilizer made by Hoechst AG
++ Tinuvin P = a commercially available light stabilizer made by Ciba-Geigy.

EXAMPLE 4

Mixtures of polyvinylbutyral containing 20.2% by weight of vinyl alcohol units and having a plasticizer content of 29% by weight are prepared analogously to Example 1. The plasticizer is composed of triethylene glycol dienanthate to which 0.03% by weight (relative to the mixture) of magnesium acetylacetonate has been added to form a clear solution.

Mixtures without added magnesium acetylacetonate are prepared similarly.

Sheeting 0.76 mm thick is extruded at 170° C. from each of the mixtures and is processed further with two float glass sheets 3 mm thick to give glass laminates. The properties of the glass laminates are shown in summary form in Table 3. Table 3

TABLE 3

The non-stick action of Mg acetylacetonate

| Mg acetylacetonate content (% by weight, relative to the mixture of PV-butyral and plasticizer) | Shear strength (MPa) | Fracture height (m) |
|---|---|---|
| 0.000 | 7.35 | 3.60 |
| 0.030 | 3.40 | 6.50 |

We claim:
1. A process for producing a thermoplastic, plasticized polyvinylbutyral molding composition which comprises mixing constituents of the molding composition with a metal-compound non-stick agent to reduce adhesion of the molding composition to glass, wherein the non-stick agent is a metal salt and/or a metal chelate of an enolizable β-diketone containing a metal of one of groups IA, IIA, IIIA, IVA and IIB of the periodic system of elements or a mixture of such compounds.

2. A process as claimed in claim 1, wherein the non-stick agent is a magnesium salt and/or a magnesium chelate of an enolizable β-diketone.

3. A process as claimed in claim 1, wherein the non-stick agent is a metal salt and/or metal chelate of acetylacetone.

4. A process as claimed in claim 1, wherein the amount of non-stick agent is from 0.003 to 0.3% by weight, relative to the weight of the plasticized polyvinylbutyral.

5. A process as claimed in claim 1, wherein the non-stick agent is in the form of a solution in plasticizer.

6. A process as claimed in claim 5 wherein the solution further comprises solvent and/or solubilizer.

7. A process as claimed in claim 1, wherein the metal salt and/or metal chelate of the β-diketone is in combination with at least one other non-stick agent.

8. A process as claimed in claim 1, wherein the molding composition is formed into sheeting after being homogeneously mixed.

9. Plasticized polyvinylbutyral sheeting having reduced adhesion to glass and produced as claimed in claim 8.

10. In a method of producing a glass laminate from a plastic sheeting pressed between two sheets of glass, the improvement wherein the sheeting is plasticized polyvinylbutyral sheeting according to claim 9.

11. A glass laminate having a laminating layer between two sheets of glass and wherein the laminating layer is plasticized polyvinylbutyral sheeting having reduced adhesion to glass, as claimed in claim 9.

* * * * *